(No Model.)
R. EADS, E. GERSON & A. J. EADS.
ANIMAL TRAP.
No. 434,434. Patented Aug. 19, 1890.
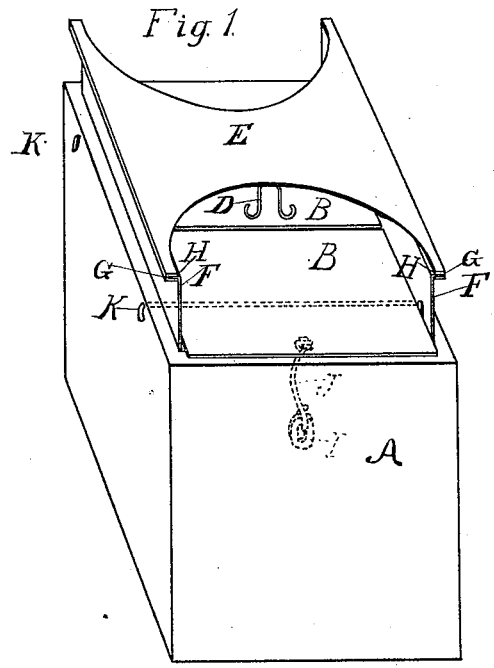
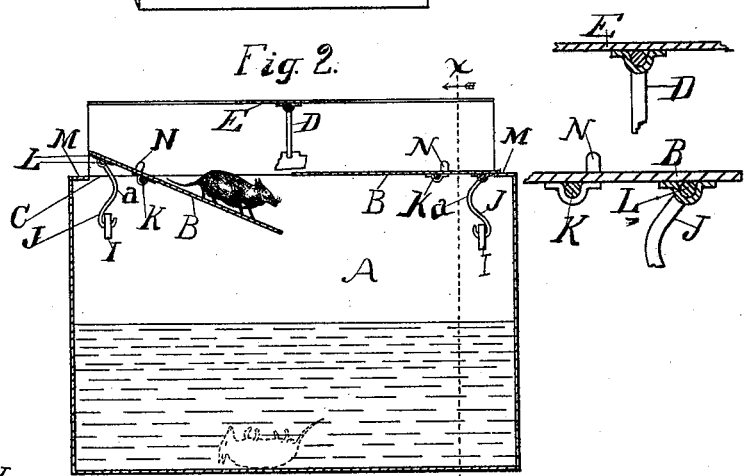
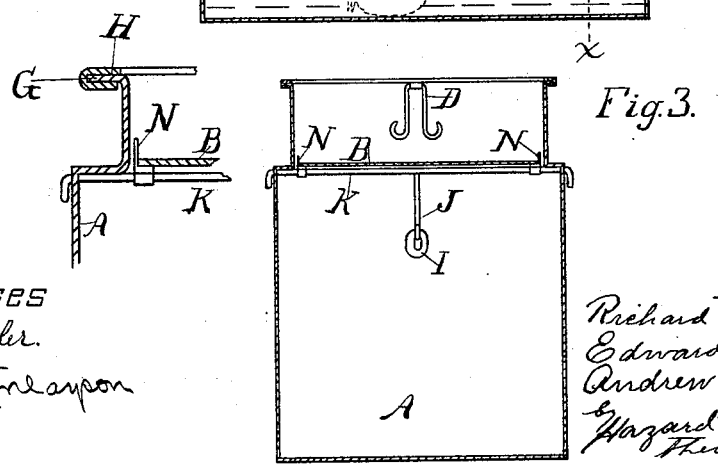
Witnesses
M. C. Galer.
James R. Finlayson
Inventors
Richard Eads
Edward Gerson
Andrew J. Eads
Hazard & Townsend
Their Attys.

UNITED STATES PATENT OFFICE.

RICHARD EADS, EDWARD GERSON, AND ANDREW J. EADS, OF POMONA, CALIFORNIA.

ANIMAL-TRAP.

SPECIFICATION forming part of Letters Patent No. 434,434, dated August 19, 1890.

Application filed December 9, 1889. Serial No. 333,056. (No model.)

*To all whom it may concern:*

Be it known that we, RICHARD EADS, EDWARD GERSON, and ANDREW J. EADS, citizens of the United States, residing at Pomona, in the county of Los Angeles and State of California, have invented a new and useful Improvement in Animal-Traps, of which the following is a specification.

Our invention relates to that class of animal-traps in which a tilting floor or trap-door is arranged to yield under the weight of the animal to precipitate it into a receptacle beneath.

One object of our invention is to so construct such trap that the animal will be led to enter it more readily.

A further object is to so construct and mount the trap-door that it will not be actuated easily until it is caused to tilt, and after it is tilted will move with great freedom, so that when the animal causes the door to tilt he will be unable to recover himself.

A further object is to secure economy by so constructing the trap that cheap material ordinarily at hand, and which might otherwise be wasted, may be used in its construction.

We accomplish these objects by means of the device described herein and illustrated in the accompanying drawings, in which—

Figure 1 is a perspective end view of our improved trap. Fig. 2 is a longitudinal vertical mid-section of the same, showing the trap in operation. An enlarged detail of the working portions of the trap is shown at the side of this figure. Fig. 3 is a vertical cross-section on line $x$ $x$, Fig. 2, looking toward the center of the trap. An enlarged detail of part of this view is given at one side of this figure.

We provide the box or receptacle A with two weight-actuated tilting doors B B', one pivoted at each end of the box above the top opening C in the upper side of the box. The depressible ends of the doors almost meet midway of the opening, space only being left between the ends to allow the doors to move freely. The bait-hook D depends above the depressible ends of the doors from a bridge E, extending over the middle portion only of such runway to form a cover over the depressible ends of the doors, the greater portion of the runway over the doors being left uncovered. The side walls F project above and are arranged one on each side of the top opening and are of equal length therewith, forming an open runway over the trap-doors throughout the length of the trap.

The box A may be of an emptied oil-can, which can ordinarily be procured at small cost, such cans being often thrown away as useless. When the trap is constructed of such material, the side walls F of the runway are made of one of the sides of the can in the following manner: The side of the can is slit longitudinally along its mid-line, and also slit transversely near each end. The sheet metal is then bent up to form the runway-walls on each side of the opening thus formed. The top edge of each wall is bent to form an outwardly-projecting flange G. The bridge E is preferably of sheet metal bent at its sides to form inwardly-opening lateral side channels H, which fit upon the flanges G, thus allowing the bridge to be easily placed in position. The weights I, which balance their respective doors and hold them in their horizontal position, are respectively secured to the lower ends of the bent weight-arms J J, which are respectively pivoted to such doors between the door-pivot K and the end of the box nearest such pivot. It will be observed that with this arrangement the weight will be made to pass through a much smaller arc when the door tilts than it would were it fixed to the door, and that when the door is in its closed position the weight has a greater leverage to counterbalance the depressible end of the door than it has at any other time. By this construction the doors are caused to yield more and more readily to the weight of the animal as they are more and more inclined, thereby making it impossible for the animal to recover himself after he has thrown enough weight upon the door to cause it to tilt. When the door begins to tilt, the animal is liable to jump forward to escape, as the trap-door at the other end of the box presents an apparently sure footing. If he succeeds in reaching the other trap-door, it tilts beneath him and precipitates him into the receptacle beneath. The bridge is made wide enough to prevent the animal from leaping upward to catch upon the top of the walls, and it is placed low enough to prevent him from leaping out at the other end of the runway—that is to say, it is placed at such height that the parabola he would necessarily describe in vaulting to the other end would bring him into contact with the bridge. The bait-hook D also forms an obstruction to prevent him from jumping to the farther end of the runway.

The weight-arm J is provided with an inwardly-projecting bend or elbow $a$, so arranged that when the door is tipped to the angle desired the upper member of the bend will come into contact with the door. The arm will then become rigid with relation to the table and will be raised by the further tilting of the table, and the weight will be moved away from the fulcrum formed by the pivot, which gives the weight an increased leverage, and will therefore operate to start the door on its return movement. The length of the arm is also regulated so that before the door reaches a perpendicular the end of the arm will strike upon the end of the box or upon the ledge M, which is left at the end of the opening to support the outer end of the door when the trap is set. When the arm strikes against the ledge or the end of the box, the door is thereby prevented from turning farther, and the weight operates to return it to its horizontal position.

N N are small lugs arranged at the edges of and projecting upward from the door above the pivot to impinge against the side walls F and hold the door in its lateral position on the pivot, which is a wire passed through holes in the sides of the box and bent at the ends to prevent removal.

The trap can be made of any size desired, and may be used without bait if set in the runs of the animals it is desired to catch. Where bait is dispensed with, the bridge may also be dispensed with. When it is desired to dispense with the bridge, it is removed by slipping it off of the flanges G.

When desired to catch vermin—such as rats, mice, rabbits, &c.—the box may be partially filled with water, so that the animals will be drowned; or if it is desired to take the animals alive suitable food may be placed in the bottom of the box, thus adding to the attractiveness of the trap.

By making the trap open throughout from end to end and covering the runway only at the middle, the suspicions of the animals are not aroused, as they are by traps having one end closed and having the runway covered.

Having described our invention, what we claim as new, and desire to secure by Letters Patent, is—

1. In an animal-trap, the combination of the box provided with the ledge M, the pivoted tilting door, the weight, and the weight-arm pivoted to the door and provided with the inwardly-projecting bend so arranged that when the door is tipped to the angle desired the upper member of the bend will come into contact with the door, the length of the arm being such that before the door reaches a perpendicular the end of the arm will strike upon the ledge.

2. An animal-trap comprising the combination of the box provided with the top opening, the two weight-actuated tilting doors, one pivoted at each end of the box above the top opening and almost meeting midway of the opening, the two side walls arranged one on each side of the top opening, with an open runway therebetween extending over the trap-doors throughout the entire length of the trap, and the bridge extending over the middle portion of such runway.

3. In an animal-trap, the combination of the box, the pivoted tilting door, the bent weight-arm pivoted to such door between the door-pivot and the end of the box nearest such pivot, and the weight secured to the lower end of such weight-arm.

RICHARD EADS.
EDWARD GERSON.
ANDREW J. EADS.

Witnesses:
JAMES R. TOWNSEND,
M. C. GALER.